United States Patent [19]

Bard

[11] Patent Number: 4,806,420
[45] Date of Patent: Feb. 21, 1989

[54] UNGLAZED CERAMIC TILE-SHAPED ARTICLE

[75] Inventor: Martin Bard, Amberg, Fed. Rep. of Germany

[73] Assignee: Buchtal Gesellschaft mit beschrankter Haftung, Fed. Rep. of Germany

[21] Appl. No.: 154,147

[22] Filed: Feb. 9, 1988

[30] Foreign Application Priority Data

Feb. 10, 1987 [DE] Fed. Rep. of Germany ....... 3704095

[51] Int. Cl.[4] .............................................. B32B 3/26
[52] U.S. Cl. ............................. 428/320.2; 428/312.6; 428/312.8
[58] Field of Search ............... 428/312.6, 312.8, 315.5, 428/315.7, 315.9, 320.2

[56] References Cited

U.S. PATENT DOCUMENTS 4,572,864 2/1986 Benson et al. .................... 428/320.2

FOREIGN PATENT DOCUMENTS 0211284 2/1987 European Pat. Off. .
1213336 3/1966 Fed. Rep. of Germany .
1278321 9/1968 Fed. Rep. of Germany .
1771361 3/1970 Fed. Rep. of Germany .

Primary Examiner—William J. Van Balen
Attorney, Agent, or Firm—Reese Taylor

[57] ABSTRACT

An unglazed ceramic tile-shaped article capable of conducting away electrical potential that reaches it into an electrically conductive substructure consists of a body having open porosity and the pores are filled with an emulsifier which behaves similarly to a metal in terms of its electrical conductivity.

6 Claims, 1 Drawing Sheet

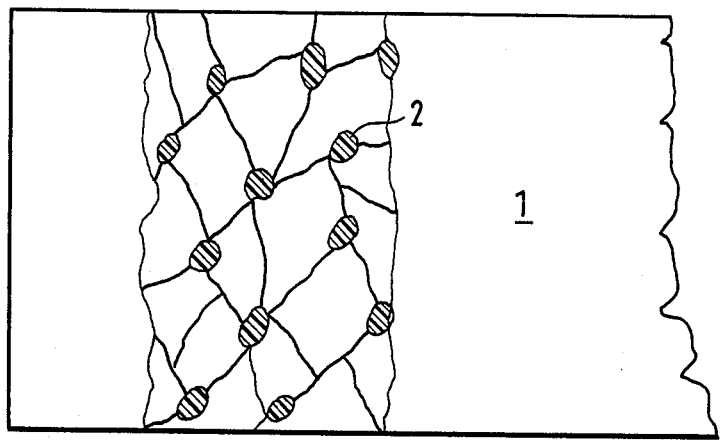

UNGLAZED CERAMIC TILE-SHAPED ARTICLE

RELATED PATENT APPLICATIONS

This Application claims priority under 35 U.S.C. 119 based on Federal Republic of Germany Application No. P 37 04 095.2 filed Feb. 10, 1987.

BACKGROUND OF THE INVENTION

The present invention relates to an unglazed tile-shaped ceramic article capable of conducting away electrical potential that reaches it into an electrically conductive substructure.

Tile-shaped electrically conductive ceramic articles can be combined to form a covering for wall and floor linings and then communicate in electrically conductive fashion with an electrically dissipative conductive substructure. Such wall and/or floor constructions are particularly well-suited for operating rooms, laboratories, industrial rooms in danger of fire, such as paint shops, paint factories, warehouses for inflammable chemicals such as solvents or the like, etc. Nowadays there is also a need for such ceramic tiles in areas where a perceptible electrical discharge on persons is to be avoided, such as in office rooms containing computers and similar electrical and electronic equipment or where electronic components such as chips are produced. Floor coverings in operating rooms are expected to ensure constant dissipation of static electricity but at the same time prevent current from flowing off in a dangerous strength in case of contact between the human body and poorly insulated current-carrying parts. Such tile-shaped electrically conductive ceramic elements are also used here as elements of floor coverings. If they are to meet the requirements, such coverings must have an electrical resistance in the range of $10^4$ to $10^6$ ohms.

Such coverings made from ceramic tile-shaped elements have advantages compared to PVC and other synthetic coverings, since the latter are insufficiently resistant to organic solvents and other chemicals used for cleaning and disinfection. Furthermore, electrically conductive organic adhesives whose conductivity values are not stable for long time periods must be used to connect such floor coverings to the electrically dissipative substructure.

Furthermore, carpet coverings made of synthetic fibers are known to charge themselves with static electricity, which one has attempted to avoid by weaving in or otherwise incorporating electrically conductive threads or wire meshes, a procedure which is expensive and does not even lead to satisfactory results.

The first attempt was to provide the visible side of tile-shaped ceramic elements for making such dissipate coverings with an electrically conductive coating. "Baukeramik" 8/84 p.96 describes a grayish blue conductive tile in a 15×15 format which is made of ceramic material and has an electrically conductive coating drawn over the side edges, so that electricity can only be conducted away via the joint material abutting the edges of such tiles and this material must be made of basic substances made electrically conductive. Since such joint material is prone to after-contraction, there is a danger of the electrical contact with the tile edges being lost at least in part. Furthermore, such joint material is quickly washed out when frequently cleaned, which may also lead to reduction of the contact surfaces. Not only does this alter the leakage resistance, the mechanical stability of the tiling also suffers. Furthermore the contraction and the wear of the joint material create tiny spaces between the tile edges and the joint material which can be clogged with germs, which is absolutely intolerable in operating rooms, for example. Finally the known tiles have a relatively small format, so that they do not have the local transition resistance required by the test standard (VDE rule 0100/5.73 Art. 24).

An improvement is described by European patent application No. 86 109 754.1 which is from the applicant. It discloses a tile-shaped ceramic element provided on the visible side with an electrically conductive surface glaze which, when the tile-like ceramic element is laid with a plurality of such elements to form a covering for wall or floor linings, communicates in conductive fashion with an electrically dissipative substructure to be provided under the covering. Such tiles can be laid to form a floor covering, for example, quite independently of the joint material, so that a joint material can be selected which completely meets all requirements for such a material in terms of its scuff resistance, its elasticity, in particular permanent elasticity, and its hygienic properties, and allows for at least part of the side of the tile-shaped ceramic element facing away from the visible side to be coated with a material that conducts electricity well and communicates in electrically conductive fashion with the surface glaze.

In order to allow for dissipation independently of the joint material, use has also been made of floor tiles made by firing molded mixtures of stoneware clay or potter's clay and iron oxide in an atmosphere customary for firing floor tiles. DE-B-17 71 361 describess a method for making such electrically semi-conductive ceramic floor tiles. However, since iron oxide is mixed into the ceramic material the unglazed ceramic surfaces have a dark color.

According to DE-B-12 78 321, electrically semi-conductive ceramic floor tiles are produced using mixtures which, due to the addition of further oxides such as ZnO, CuO, CoO, PbO, $Sb_2O_3$, BaO, CaO, MgO, etc., singly or mixed and in amounts of 0.5 to 7% relative to the fired body, are to effect a further reduction of specific resistance and allow for changes in the firing color ranging from red to black. These tiles are pressed out of the starting material and are, therefore, limited to their dimensions to 5×5 cm, for example, as indicated by a remark in DE-B-12 13 336.

This DE-B-12 ·13 336 also conveys to an expert a method for making electrically semi-conductive tiles by mixing a granular ceramic floor tile compound of the conventional type in a weight ratio of 4:1 to 12:1 with a ceramic compound containing $Fe_2O_3$ and other metallic oxides, preferably ZnO, which results in the fired state in an electrically conductive body, pressing this mixture into tiles and firing them at 1200° to 1250° C. in a normal industrial kiln in an oxidizing atmosphere.

In this method as well, the tiles are thus pressed out of a dry starting compound, which considerably restricts the final tile format.

Due to the required water absorption of <1% necessary in connection with the body conduction to avoid fluctuations in dissipation ability because of different moisture contents in the tiles, due to a certain porosity and different water contents therein as a result of changes in the moisture supply, for example via the floor cleaning, the difficulties of contraction and cracking during production connected with such a high iron oxide content are particularly serious in the proposed solutions mentioned above. The iron oxide content cannot be reduced since this leads to an immediate increase in electrical resistance.

The attempt to bind other metallic electrical conductors into the ceramic compound in order to achieve different color effects fails due to the excessive proportion of conductive parts in the total volume, because the dissipation of electricity through the ceramic article necessarily requires contact between the individual particles and the customary electrically conductive metal powders or granulates have a spherical form. Such conductors which have poor electrical conductivity aggravate the quantitative problem for achieving sufficient conductivity. Those having good electrical conductivity involve the same problem in achieving conductivity as such, since that latter can no longer be kept small enough to ensure a sufficienty small local transition resistance. In addition, such proposed solutions involve the problem that the sintering and contraction behavior of such compounds cannot be mastered technically and financially.

SUMMARY OF THE INVENTION

The invention is thus based on the problem of providing an unglazed ceramic tile-shaped article capable of conducting away electrical potential directly into an electrically dissipative substructure provided under a covering made of a plurality of such tiles, whereby the resistance of such a covering is between approximately $10^4$ and $10^6$ ohms, the article's external appearance does not differ from the unglazed articles customary in ceramics up to now, i.e. includes all customary color nuances, and the article also has the usual format of a multiple of 5×5 cm.

This is achieved according to the invention by the following features: the article consists of a body having open and communicating pores and the pores are filled with an emulsifier which behaves similarly to a metal in terms of its electrical conductivity. Such emulsifiers are sold, for example, by the Henkel company under the trade name Nonax 975 and Nonax 1166.

The open porosity of the article should be less than 10 percent by volume, whereby a porosity of 7 to 8% has proved to be particularly wellsuited.

According to a particularly preferred embodiment of the invention, at least 75% of the open pores should have a pore diameter of <0.75 µm.

Such pore sizes and distributions in ceramic bodies can be determined by suitable selection of the argillaceous raw materials and flux, their mineral make-up and their fineness. The emulsifier used may be polyethylene glycol which, due to its molecular structure and its chemism, behaves similarly to a metal in terms of its conductivity. The emulsifier is introduced into the pore space of the ceramics in an alkaline medium.

In a subsequent temperature treatment between 100° and 130° C., this substance cross-links in the pore and forms a durable, water-insoluble pore filling which is resistant to chemical cleaning agents but permanently hygroscopic. If air moisture is constantly supplied—the relative air moisture in air-conditioned rooms is generally between 30 and 70%—this suffices to set going an electrical conduction mechanism in this cross-linked synthetic material. The level of conductivity now depends on the amount of molecules/cm$^3$ of the cross-linked material and thus on the magnitude of the available pore space, its statistical distribution and the pore size, provided these pores communicate openly in a system.

It has proved to be particularly advantageous to use a fine-pore ceramic material of the described type, since capillary suction forces for the saturation process of the pores are most effective here, on the one hand, and the available pore space corresponds excellently with the cross-linking ability as a space filling, on the other hand.

The inventive article obtained is a permanently electrically dissipative body which has the advantages of an unglazed ceramic material, such as scuff resistance, resistance to slipping and attractive color variation, combined with an exactly adjustable and permanent electrical conductivity.

OF THE DRAWINGS:

The drawing shows an enlarged view of a partial cross-section, indicating open pores 2 communicating in a ceramic tile 1 which are filled in the final state with the cross-linked emulsifier.

EXAMPLE 34 percent by weight of china clay
19 percent by weight of china clay/illite
27.5 percent by weight of potassium-sodium feldspar
19.5 percent by weight of quartz,
all parts being finer than 63 µm. A tile-shaped ceramic article formed in the usual way from these starting materials, for example, by extrusion, has after firing on an open porosity from 7 to 8 %, 75% of these pores having a pore diameter of <0.5 µm. Such a tile-shaped ceramic article is soaked in polyethylene glycol to the point of saturation, then dried in heat at approximately 100° to 130° C. for a period of 1 to 2 hours.

What is claimed is:

1. An unglazed ceramic tile-shaped article for wall and floor coverings, which is capable of conducting away electrical potential that reaches it into an electrically conductive substrate, characterized in that the article consists of a body having open communicating pores which are filled with an emulsifier which behaves similarly to a metal in terms of its electrical conductivity.

2. A ceramic article according to claim 1, characterized in that the open porosity of the article is smaller than 10%, preferably 7 to 8%.

3. A ceramic article according to claim 1 or 2, characterized in that at least approximately 75% of the open pores have a pore diameter of <0.75 µm.

4. A ceramic article according to any of the above claims, characterized in that the emulsifier used is a cross-linkable synthetic material.

5. A ceramic article according to any of the above claims, characterized in that the emulsifier used is polyethylene glycol.

6. A ceramic article according to claim 5, characterized in that the emulsifier is introduced into the pores of the article in an alkaline medium and cross-linked by temperature treatment between 100° and 130° C.

* * * * *

UNITED STATES PATENT AND TRADEMARK OFFICE
CERTIFICATE OF CORRECTION

PATENT NO. : 4,806,420
DATED : February 21, 1989
INVENTOR(S) : Martin Bard

It is certified that error appears in the above-identified patent and that said Letters Patent is hereby corrected as shown below:

In Column 1, Line 54, delete "dissipate" and substitute therefor --dissipative--.

In Column 3, Line 19, delete "sufficienty" and substitute therefor --sufficiently--.

In Column 4, Line 44, delete "substrate" and substitute therefor --substructure--.

Signed and Sealed this

Twenty-second Day of August, 1989

Attest:

DONALD J. QUIGG

*Attesting Officer*       Commissioner of Patents and Trademarks